(12) United States Patent
Honma et al.

(10) Patent No.: US 6,269,013 B1
(45) Date of Patent: Jul. 31, 2001

(54) CHOPPING ENERGIZATION CONTROL DEVICE

(75) Inventors: Chiaki Honma; Masanori Sugiyama, both of Aichi-ken (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/585,362

(22) Filed: Jun. 2, 2000

(30) Foreign Application Priority Data

Jun. 2, 1999 (JP) .................................................. 11-155518

(51) Int. Cl.[7] .............................. H02M 7/00; H02M 7/68; H02M 7/44
(52) U.S. Cl. ............................. 363/124; 363/98; 388/920; 318/771
(58) Field of Search ...................................... 388/920, 857, 388/858; 318/771, 701, 685; 363/124, 95, 98, 97

(56) References Cited

U.S. PATENT DOCUMENTS

| 4,933,621 | * | 6/1990 | MacMinn et al. | 318/696 |
|---|---|---|---|---|
| 5,166,591 | * | 11/1992 | Stephens et al. | 318/701 |
| 5,825,153 | * | 10/1998 | Doyle | 318/701 |
| 5,999,431 | * | 12/1999 | Sugiyama | 363/95 |
| 6,051,942 | * | 4/2000 | French | 318/254 |
| 6,054,819 | * | 4/2000 | Pengov | 318/254 |
| 6,087,799 | * | 7/2000 | Turner | 318/701 |
| 6,137,256 | * | 10/2000 | Morris | 318/701 |

FOREIGN PATENT DOCUMENTS

| 8-172793 | 7/1996 | (JP) | H02P/7/05 |
|---|---|---|---|
| 10-337084 | 12/1998 | (JP) | H02P/7/05 |

* cited by examiner

*Primary Examiner*—Peter S. Wong
*Assistant Examiner*—Bao Q. Vu
(74) *Attorney, Agent, or Firm*—Sughrue, Mion, Zinn, Macpeak & Seas, PLLC

(57) ABSTRACT

A chopping energization control device is made up of a first switching element interposed between one end of a load and one terminal of a power supply, a second switching element interposed between the other end of the load and the other terminal of the power supply, a signal generation device for generating an energization indication signal which makes the first switching element and the second switching element conductive in order to establish a chopping energization control of the load, and a control device for giving a delay, in response to the energization indication signal, between when the first switching element is made to be conductive and when the second switching element is made to be conductive. The control device has a changeover device for establishing, whenever a set time duration elapses, that an earlier conductive switching element and a later conductive switching element are interchanged with each other where the one of the first switching element and the second switching element and the other are defined as the earlier conductive switching element and the later conductive switching element, respectively.

2 Claims, 6 Drawing Sheets

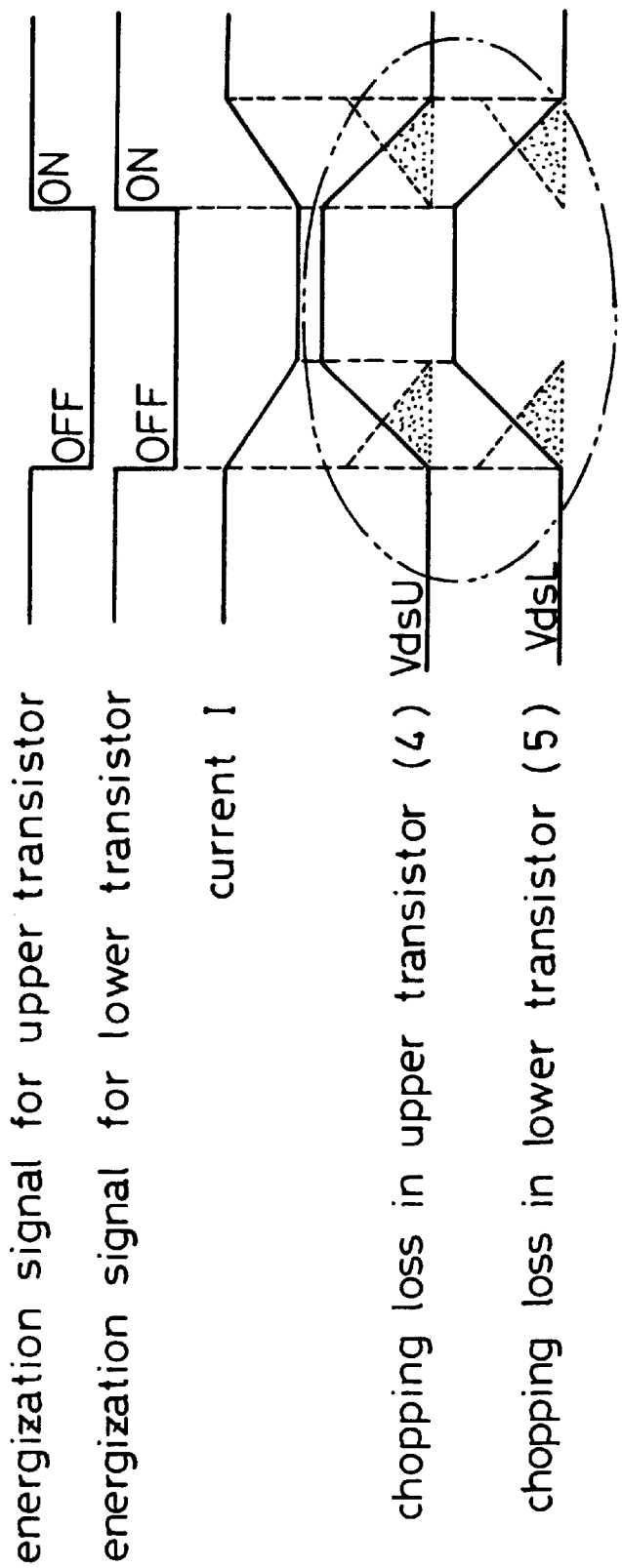
Fig. 5(a) [prior art]

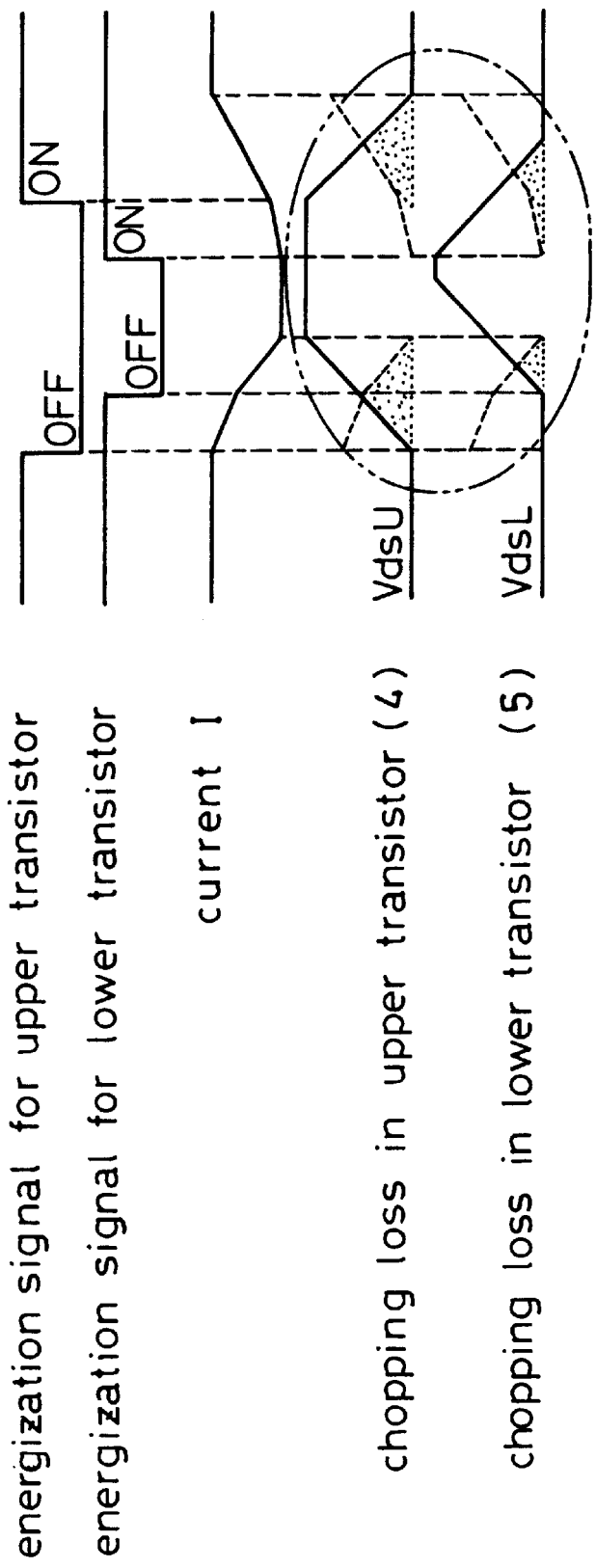
Fig. 5(b) [prior art]

CHOPPING ENERGIZATION CONTROL DEVICE

BACKGROUND OF THE INVENTION

1. Field of the Invention

The present invention is directed to a chopping energization control device including a switching element interposed between one end of a load and one terminal of a power supply and another switching element interposed between the other end of the load and the other terminal and energizing the on chopping mode in such a manner that both the switching elements are turned on and off load in synchronization and such operations are repeated. This chopping energization device is used, for example, to energize each of plural phase coils of a SR motor (Switched Reluctance Motor)

2. Prior Art

For example, in a device for energizing an SR motor or an SR driver for switching plural (for example, 3) phases or alternating energization and deenergization of the phase coil of each of the plural phases in order to operate the SR motor, a pair of switching elements are provided at opposite ends of the phase coil and the upper side switching element or both of the switching elements are turned on and off in intermittent fashion (chopping operation). In addition, for delivering a predetermined output torque from the SR motor, an amount of target current is passed through the phase coil in such a manner that the amount is regulated to be constant by turning on and off the switching elements in alternate fashion. Conventionally, when the switching element, which is in the form of an insulated gate bipolar transistor, is brought into chopping mode operation, the resultant electric power loss of the switching element has been at issue due to the fact that such the loss is turned into heat which will bring thermal breakdown of the module. In order to prevent such a drawback, the inventor has proposed a device for the prevention of overheating in Japanese Patent Laid-open Print No. Hei. 10-337084 which operates in such a manner that the temperature of the switching module is measured, the temperature changing speed is calculated which corresponds to the amount of current passed in the phase coil, based on these variables the instant temperature in the switching module is estimated, and if the instant current is found to be higher the current passed through the phase coil is restricted. On the other hand, as to bow to maintain the target amount of current at a constant value, the inventor provides three methods in Japanese Patent Laid-open Print No. Hei. 8-172793. One of the methods, so-call soft chopping method, is to turn on and off one of the switching elements in alternate fashion which are associated with the phase coil. The second method, so-called hard chopping, is to turn on and off alternately one of the switching elements in synchronization with alternate turning on and off the other. The third method is a combination of the soft chopping method and the hard chopping method which is established depending on the driving condition of the SR motor.

However, when the hard chopping method is employed, due to the fact that one of the switching elements differs inevitably from the other in switching characteristics, even though both the switching elements are driven by a common signal, simultaneous same switching actions of the switching elements are not always established. Thus, due to the resulting timing error, an electric power loss or chopping loss is concentrated in either of the switching elements.

SUMMARY OF THE INVENTION

It is, therefore, a principal object of the present invention to provide a chopping energization control device in which the foregoing chopping loss unbalance is restricted to be as small as possible.

In order to attain the foregoing object, a first aspect of the present invention provides a chopping energization control device which comprises:

first switching means interposed between one end of a load and one terminal of a power supply;

second switching means interposed between the other end of the load and the other terminal of the power supply;

signal generation means for generating an energization indication signal which makes the first switching means and the second switching means conductive in order to establish a chopping energization control of the load; and control means for giving a delay, in response to the energization indication signal, between when the first switching means is made to be conductive and when the second switching means is made to be conductive.

A second aspect of the present invention is to provide a chopping energization control device by modifying the first aspect in such manner that the control means includes a changeover means for establishing, whenever a set time duration elapses, that an earlier conductive switching means and a later conductive switching means are interchanged with each other where the one of the first switching means and the second switching means and the other are defined as the earlier conductive switching means and the later conductive switching means, respectively.

BRIEF DESCRIPTION OF THE DRAWINGS

The above and other objects, features and advantages of the present invention will be more apparent and more readily appreciated from the following detailed description of a preferred exemplary embodiment of the present invention, taken in connection with the accompanying drawings, in which;

FIG. 5(a) illustrates a time chart showing conceptually illustrated chopping losses in switching elements assuming that no difference in chopping loss is found between the switching elements; and FIG. 5(b) illustrates a time chart showing conceptually illustrated chopping losses in switching elements assuming that an extreme difference in chopping loss is found between the switching elements.

DETAILED DESCRIPTION OF THE PRESENT INVENTION

A preferred embodiment of the present invention will be described hereinafter in detail with reference to the accompanying drawings.

Figure 1:
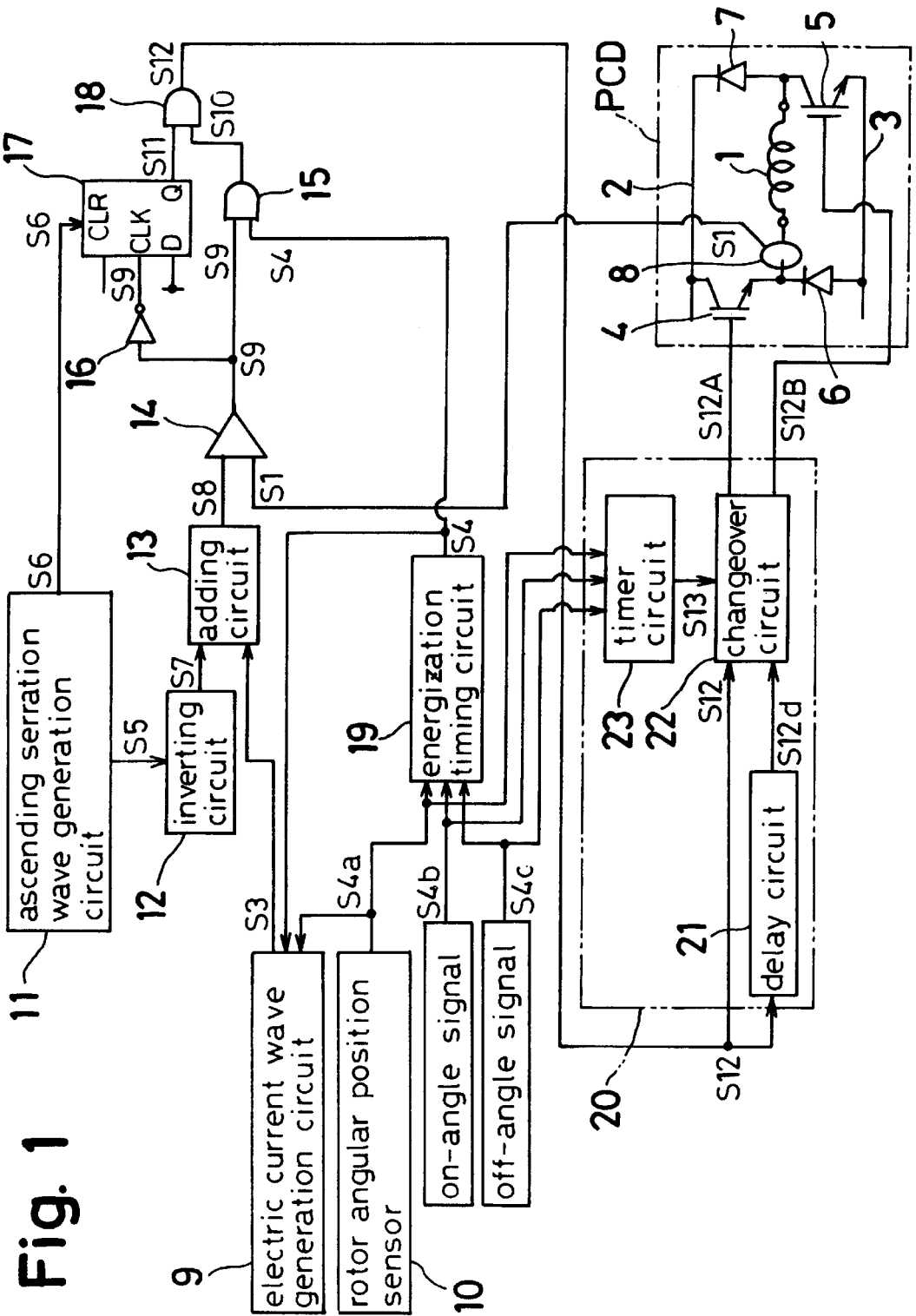
FIG. 1 illustrates a block diagram of an energization control device.
Figure 2:
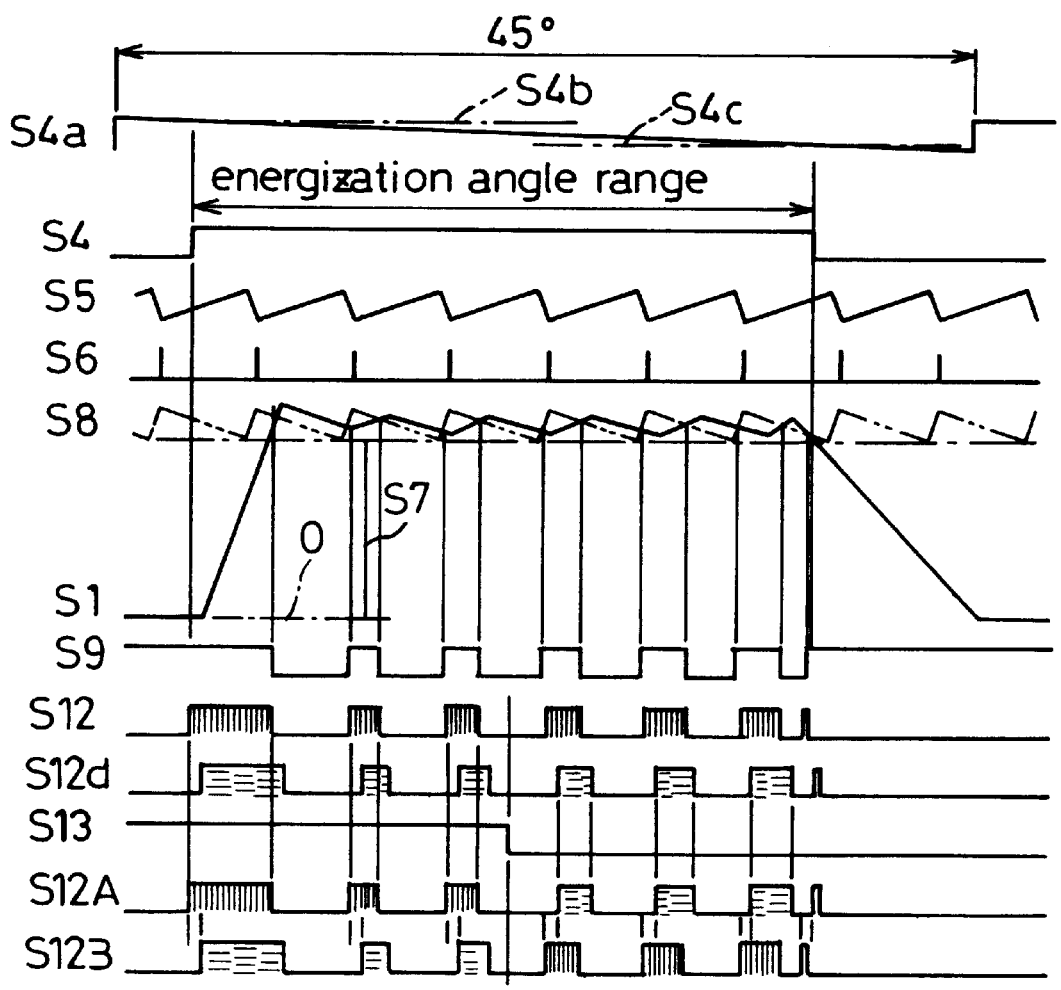
FIG. 2 illustrates a time chart in which are depicted wave-shapes of main elements of the device shown in FIG. 1.

First of all, with reference to FIGS. 1 and 2, there is illustrated a block diagram of an energization controller for a phase coil 1 of a switched reluctance motor or SR motor (not shown). One end of the phase coil 1 is electrically connected to a power supply higher voltage line 2 by way of an insulated gate bipolar transistor (IGBT) 4 as an upper transistor, while the other end of the phase coil 1 is electrically connected to a power supply lower voltage line 3 by way of an insulated gate bipolar transistor (IGBT) 5 as a lower transister. A diode 6 is interposed between an emitter of the transistor 4 and the power supply low voltage line 3. A diode 7 is interposed between a collector of the transistor 5 and the power supply high voltage line 2. Thus, if the transistors 4 and 5 are turned on concurrently, an electric current passes through the phase coil 1. An electric current sensor 8 issues a current signal S1 which represents the amount of electric current passing through the phase coil 1 and feeds the same to a comparator 14.

On the basis of a signal 54a from a rotor angular position sensor 10 which represents a rotor angular position of the SR motor, an electric current wave generation circuit 9 generates a signal S3 which represents a criteria amount of the electric current to be applied to the phase coil 1 in response to the angular position of the rotor determined by the rotor angular position sensor 10. The electric current wave generation circuit 9 feeds such a signal S3 to an adding circuit 13. An energization timing circuit 19 generates a two-value signal S4 which represents either a high level H or a low level L. While the angular position of the rotor falls in an energization angle range between an initiation and a termination of energization of the phase coil 1 which are recognized by an ON-angle signal S4b and an OFF-angle signal S4c, respectively, the circuit 19 issues the signal S4 at high level H. While the rotor is within a first quarter rotation (0–45 degrees), the circuit 19 issues the signal at low level L except that the angular position of the rotor falls in the energization angle range. In a second quarter rotation of the rotor, the signal S4 remains at low level L. In a third quarter rotation of the rotor, the signal S4 remains at high level H.

An ascending serration wave generation circuit 11 generates an ascending serration wave signal S5 which is constant in cycle and amplitude and a criteria chopping signal S6 in synchronization with the ascending serration wave signal S5. The timing signal S6 is in the form of a two-value signal which represents instantaneously high level H whenever a fixed time of one cycle passes. That is to say, every one-cycle, the timing signal S6 establishes an instantaneous change in an order of low level L, high level H, and low level L. The criteria chopping signal S6 has a cycle which is set to be identical with one cycle of a frequency which is slightly higher than a human audible frequency band. An inverting circuit 12 is designed to issue a descending serration wave signal S7 by inverting the ascending serration signal S5. An adding circuit generates a corrected criteria signal S8 by superposing the descending wave signal S7 on the criteria current signal S3.

The comparator circuit 14 makes a comparison between the electric current signal S1 and the corrected criteria current signals 8. The comparator circuit issue a two-value signal S9 such that if the result of such a comparison indicates of the signal S1 is less than the signal S8 or not the signal S9 becomes high level H or low level L, respectively.

The two-value signal S9 is fed to one of the input terminals of an AND-gate 15 and is also inputted to an input terminal CLK of a flip-flop 17 after being inverted by an inverter 16. The other input terminal of the AND-gate 15 is inputted with the signal S4. A two-value signal S10 output-ted from the AND-gate 15 is fed to one of input terminals of an AND-gate 18. The other input terminal of the AND-gate 18 is inputted with a two-value signal S11 which is outputted from an inverted output terminal of the flip-flop 17. The other input terminal of the flip-flop 17 receives the criteria chopping timing signal S6. The two-value signal outputted from the inverted output terminal of the flip-flop 17 changes from high level H to low level L in response to a falling of the signal S9 and changes from low level L to high level H in response to a rising of the signal S9. While the signal S11 is at high level H, the two-value signal S12 outputted from the AND-gate 18 becomes high level H and low level L if the two-value signal S10 is at high level H and low level L, respectively.

The AND-gate 18 issues a two-value signal S12, as an energization indication signal, which indicates an energization (ON) and de-energization (OFF) of the phase coil 1 when its high level H and low level L, respectively. The energization indicating signal S12 is fed to a delay circuit 21 and a changeover circuit 22 of a delay control device 20.

Figure 3:
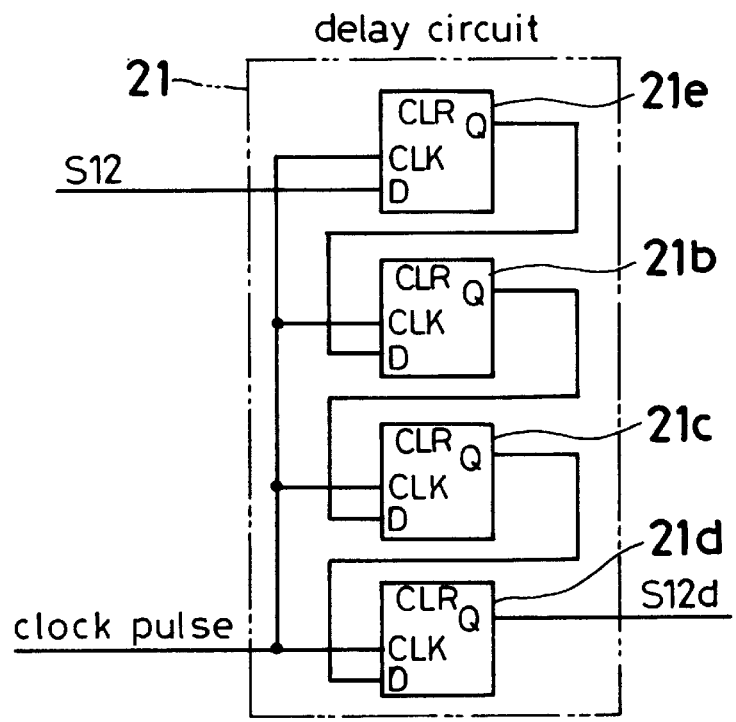
FIG. 3(a) illustrates a block diagram of a delay circuit of the device shown in FIG. 1.
FIG. 3(b) illustrates a block diagram of a changeover circuit of the device shown in FIG. 1.
Figure 3:
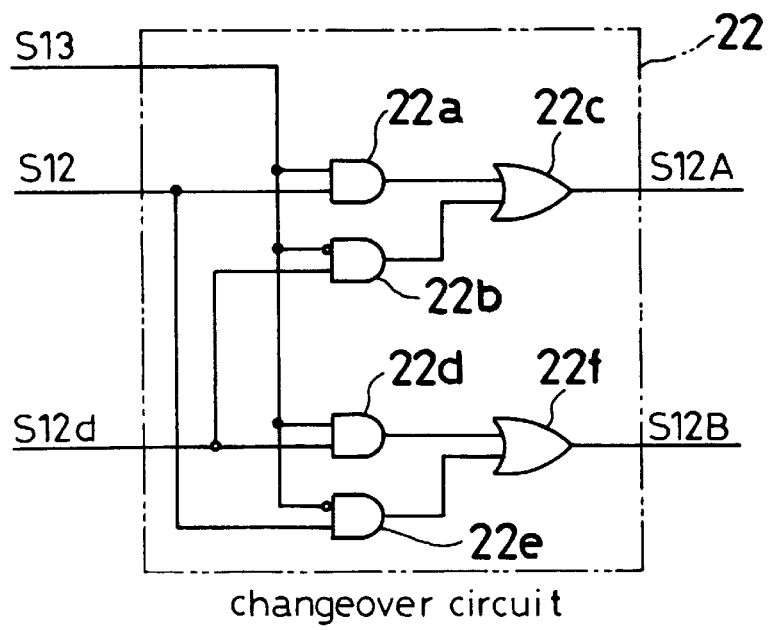

In the present embodiment, as shown in FIG. 3(a), the delay circuit 21 is in the form of a serial shift resister in which four flip-flops 21a, 21b, 21c, and 21d which operate in synchronization with a clock pulse signal are connected in series. The delay circuit 21 is designed to issue a delayed signal S12d to which a delay of about 3-time Tc representing a cycle of the clock pulse signal is given such that the signal S12 is made to pass through the flipflops 21a, 21b, 21c, and 21d in such an order.

As shown in FIG. 3(b), the changeover circuit 22 includes an ANDgate 22a of a first output system (A-system) and an AND-gate 22e of a second output system (B-system) for the selection of the energization indicating signal S12, an AND-gate 22b of the first output system and an AND-gate 22d of the second output system for the selection of the delay signal S12d, an OR-gate 22c which calculates a logic-addition of outputs of the respective AND-gates 22a and 22b of the first output system and an OR-gate 22f which calculates a logic-addition of outputs of the respective AND-gates 22d and 22e of the second output system. Depending on a signal S13 issued from a timer circuit 23 which AND-gate is activated in each output system is determined.

The timer circuit 23 generates the switching signal S13 which changes alternately between low level L and high level H whenever the angular position signal S4a which indicates level change of the serrated wave signal whose one cycle is in coincidence with a quarter rotation of the rotor traverses an average value of the levels of the respective signals which is defined as a formula of (S4b +S4c)/2.

Thus, in an earlier half of the energization angle range of the phase coil 1 during which the signal S4 continues to be at high level H, the AND-gates 22a and 22d of the changeover circuit 22 are brought into gate-on conditions, respectively, immediately when the switching signal S13 becomes high level H. The output of the OR-gate 22c, i.e., an energization indication signal S12A to the transistor 4 becomes the energization indication signal S12 itself, while the output of the OR-gate 22f, i.e., an energization indication signal S12B to the transistor 5 becomes a delay S12d.

In a later half of the energization angle range of the phase coil 1 during which the signal 54 continues to be at high level H, the AND-gates 22b and 22e of the changeover circuit 22 are brought into gate-on conditions, respectively, immediately when the switching signal S13 becomes low level L. The output of the OR-gate 22c, i.e., an energization indication signal S12A to the transistor 4 becomes the delay signal S12d, while the output of the OR-gate 22f, i.e., an energization indication signal S12B to the transistor 5 becomes the energization indication signal S12.

Consequently, in the whole energization angle range of the phase coil 1 during which the signal S4 remains at high level H, between the energization indication signals S12A and S12B fed to the respective transistors 4 and 5, there is a time or phase difference of about 3-time corresponding to the delayed time of the delay signal S12d relative to the energization indication signal S12. This causes an establish chopping loss to be allocated to the transistors 4 and 5 alternately while alternating ON and OFF is repeated, which leads to a smaller chopping loss difference between the transistors 4 and 5, with the result that a partial temperature increase can be restricted in a switching module, thereby preventing breakage of the transistors.

Figure 4A:
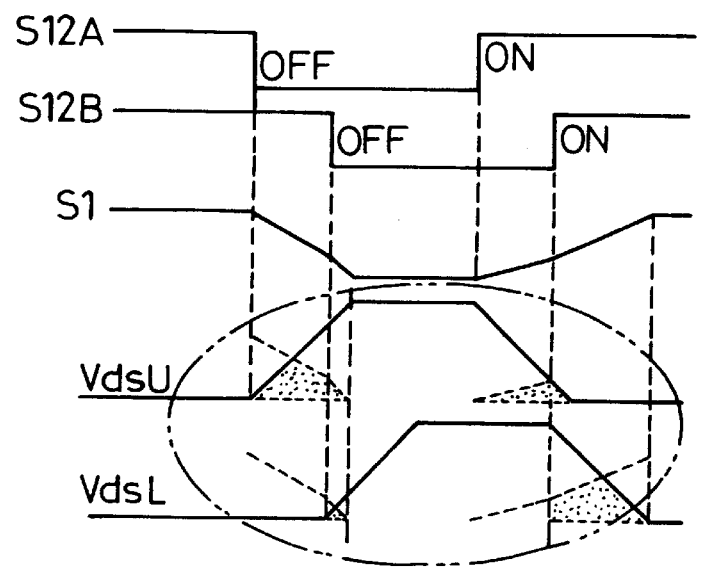
FIG. 4(a) illustrates a time chart showing conceptually illustrated chopping losses in switching elements of the device shown in FIG. 1 in the first half of an energization angle range.
Figure 4B:
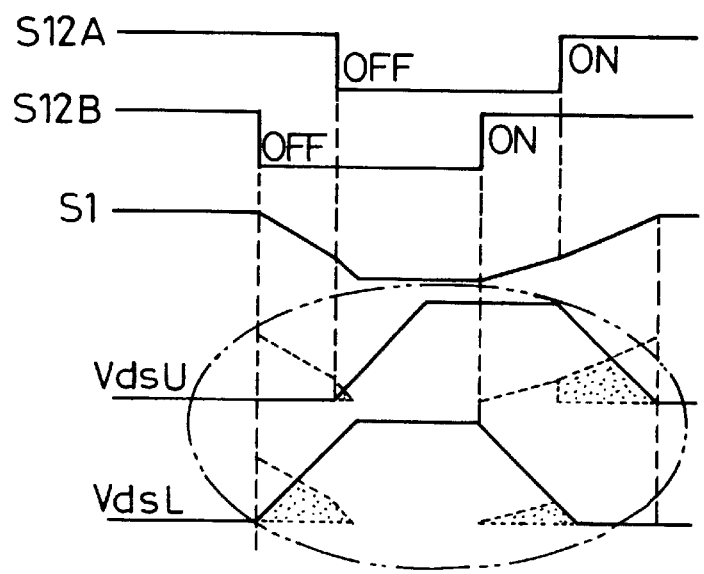
FIG. 4(b) illustrates a time chart showing conceptually illustrated chopping losses in switching elements of the device shown in FIG. 1 in a second half of an energization angle range.

In addition, in the earlier half part of the energization angle range of the phase coil 1, though the switching action or alternating ON/OFF repetition action of the transistor 4 is made in synchronization with the energization indication signal S12, the switching action of the transistor 5 delays form the switching action of the transistor 4 by about 3Tc and the chopping loss which is a shaded portion in the chart in each of the transistors 4 and 5 comes to have a tendency as shown in FIG. 4(a). On the other hand, in the later half cycle, the switching action of the transistor 4 delays by about 3Tc from the energization indication signal S12, while the switching action of the transistor 5 becomes in synchronization with the energization indication signal S12, and each of the chopping loss of the transistors 4 and 5 comes to have a tendency as shown in FIG. 4(b).

Thus, even through giving a delay between the switching actions of the transistors 4 and 5 of different switching characteristics results in that unsatisfactory solution of the unbalanced condition between the transistors 4 and 5 in chopping loss, every quarter rotation of the rotor of the SR motor or the set time duration, the unbalance is switched at the midpoint of the energization angle range in such a manner that one of the transistors 4 and 5 which has been of larger chopping loss turns to be of smaller chopping loss, while the other becomes of larger chopping loss, whereby further equalization of chopping loss is prompted between the transistors 4 and 5, with the result that the chopping loss unbalance between the transistors 4 and 5 becomes further smaller and smaller.

The foregoing merits derived from the present invention becomes apparent from the following description when referring to FIGS. 5(a) and 5(b). In detail, a time-series combination of the time-charts shown in the respective FIGS. 4(a) and 4(b) becomes very close to a time-series combinations of the time-charts shown in the respective FIGS. 5(a) and 5(a). Due to the fact that FIG. 5(a) shows an ideal condition wherein no difference in chopping loss is found between the switching elements, the present invention provides a substantial balanced condition in chopping loss between the switching elements.

The foregoing merits of the present invention also becomes apparent when compared to the condition shown in FIG. 5(b) which indicates chopping losses in the respective switching elements differed extremely as the conventional chopping energization control device which can be structured by the delay control device 20 from the diagram shown in FIG. 1.

The invention has thus been shown and described with reference to a specific embodiment, however, it should be understood that the invention is in no way limited to the details of the illustrates structures but changes and modifications may be made without departing from the scope of the appended claims.

What is claimed is:

1. A chopping energization control device comprising:

first switching means interposed between one end of a load and one terminal of a power supply;

second switching means interposed between the other end of the load and the other terminal of the power supply;

signal generation means for generating an energization indication signal which makes the first switching means and the second switching means conductive in order to establish a chopping energization control of the load; and control means for providing a delay in conductive time of one of the switching means relative to conductive time of the other of the switching means in response to the energization indication signal.

2. A chopping energization control device as set forth in claim 1, wherein the control means includes a changeover means for establishing, whenever a set time duration elapses, that an earlier conductive switching means and a later conductive switching means are interchanged with each other where the one of the first switching means and the second switching means and the other are defined as the earlier conductive switching means and the later conductive switching means, respectively.

* * * * *